United States Patent
Holmes

(10) Patent No.: US 6,580,845 B1
(45) Date of Patent: Jun. 17, 2003

(54) METHOD AND DEVICE FOR SWITCHING WAVELENGTH DIVISION MULTIPLEXED OPTICAL SIGNALS USING EMITTER ARRAYS

(75) Inventor: Richard B. Holmes, Cameron Park, CA (US)

(73) Assignee: General Nutronics, Inc., Cameron Park, CA (US)

( * ) Notice: Subject to any disclaimer, the term of this patent is extended or adjusted under 35 U.S.C. 154(b) by 155 days.

(21) Appl. No.: 09/666,898

(22) Filed: Sep. 20, 2000

Related U.S. Application Data

(60) Provisional application No. 60/224,692, filed on Aug. 11, 2000.

(51) Int. Cl.[7] .............................. G02B 6/35; G02B 6/42
(52) U.S. Cl. ........................................... 385/16; 385/24
(58) Field of Search ............................... 385/15, 16, 17, 385/18, 19, 20–24

(56) References Cited

U.S. PATENT DOCUMENTS

| | | | |
|---|---|---|---|
| 3,558,898 A | 1/1971 | Block et al. | |
| 3,608,992 A | 9/1971 | Phelps et al. | |
| 3,630,593 A | 12/1971 | Bartelt et al. | |
| 3,652,858 A | 3/1972 | Kinsel | |
| 3,838,903 A | 10/1974 | Leith et al. | |
| 3,953,727 A | 4/1976 | d'Auria et al. | |
| 4,274,103 A | 6/1981 | Yamamoto et al. | |
| 4,329,017 A | 5/1982 | Kapany et al. | |
| 4,366,565 A | * 12/1982 | Herskowitz | 359/116 |
| 4,652,080 A | 3/1987 | Carter et al. | |
| 4,662,715 A | * 5/1987 | Shutterly | 385/24 |
| 4,701,012 A | 10/1987 | Kaiser | |
| 4,723,829 A | 2/1988 | Koonen | |
| 4,812,682 A | 3/1989 | Holmes | |
| 4,824,200 A | 4/1989 | Isono et al. | |
| 4,963,727 A | 10/1990 | Cova | |
| 5,026,131 A | 6/1991 | Jannson et al. | |
| 5,037,173 A | 8/1991 | Sampsell et al. | |
| 5,056,887 A | 10/1991 | Ohshima | |
| 5,078,499 A | 1/1992 | LaMarche | |
| 5,082,354 A | 1/1992 | Kalmanash | |
| 5,148,323 A | 9/1992 | Campbell et al. | |
| 5,153,665 A | 10/1992 | Weinstein | |

(List continued on next page.)

FOREIGN PATENT DOCUMENTS

| | | |
|---|---|---|
| DE | 004101044 | 12/1991 |
| GB | 2263371 | 7/1993 |
| GB | 2270224 | 3/1994 |
| JP | 0202102 | 11/1983 |
| JP | 0223816 | 10/1986 |
| JP | 0282824 | 12/1986 |
| JP | 0221925 | 9/1991 |
| JP | 404030127 | 2/1992 |
| JP | 404030129 | 2/1992 |
| JP | 405188405 | 7/1993 |

Primary Examiner—John D. Lee
Assistant Examiner—Daniel Valencia
(74) Attorney, Agent, or Firm—Rolando J. Tong; Ian F. Burns & Assoc.

(57) ABSTRACT

A switch device and method is disclosed that is capable of switching wavelength division multiplexed optical signals. The device comprises a switch element, which may include a detector, an emitter array, and a switch controller. The detector is adapted to detect optical signals and is positioned to receive light from a source. The emitter array is positioned to transmit light to a plurality of targets. The emitter comprises a plurality of emitters, each emitter being adapted to generate light signals. The light signals generated by each emitter are transmitted to at least one predetermined target. The switch controller is in communication with the detector and the emitter array. The switch controller is adapted to cause the emitter array to generate the detected signal. The switch elements are grouped in an array and dichroic beam splitters may be used to reflect predetermined ranges of wavelengths to the individual switch elements.

8 Claims, 7 Drawing Sheets

U.S. PATENT DOCUMENTS

| | | | |
|---|---|---|---|
| 5,159,407 A | 10/1992 | Churnside et al. | |
| 5,204,866 A | 4/1993 | Block et al. | |
| 5,218,654 A * | 6/1993 | Sauter | 385/24 |
| 5,229,878 A | 7/1993 | Tomita et al. | |
| 5,247,593 A | 9/1993 | Lin et al. | |
| 5,255,332 A | 10/1993 | Welch et al. | |
| 5,311,344 A | 5/1994 | Bohn et al. | |
| 5,350,913 A | 9/1994 | Aoshima et al. | |
| 5,392,377 A | 2/1995 | Auracher | |
| 5,469,250 A | 11/1995 | Holmes | |
| 5,469,277 A | 11/1995 | Kavehrad et al. | |
| 5,485,538 A | 1/1996 | Bowen et al. | |
| 5,521,733 A | 5/1996 | Akiyama et al. | |
| 5,521,743 A | 5/1996 | Holmes et al. | |
| 5,530,577 A | 6/1996 | Orino et al. | |
| 5,557,693 A | 9/1996 | Stevens et al. | |
| 5,583,683 A | 12/1996 | Scobey | |
| 5,629,992 A | 5/1997 | Amersfoort et al. | |
| 5,663,822 A | 9/1997 | Fee | |
| 5,737,104 A | 4/1998 | Lee et al. | |
| 5,745,614 A | 4/1998 | Kersten et al. | |
| 5,754,320 A | 5/1998 | Watanabe et al. | |
| 5,781,671 A | 7/1998 | Li et al. | |
| 5,784,184 A | 7/1998 | Alexander et al. | |
| 5,857,042 A | 1/1999 | Robertson et al. | |
| 5,859,717 A | 1/1999 | Scobey et al. | |
| 5,864,413 A | 1/1999 | Feldman et al. | |
| 5,864,415 A | 1/1999 | Williams et al. | |
| 5,896,212 A | 4/1999 | Sotom et al. | |
| 5,903,687 A | 5/1999 | Young et al. | |
| 5,910,851 A | 6/1999 | Flaherty | |
| 5,937,117 A | 8/1999 | Ishida et al. | |
| 5,940,511 A | 8/1999 | Wilfong | |
| 5,943,150 A | 8/1999 | Deri et al. | |
| 5,960,133 A | 9/1999 | Tomlinson | |
| 5,970,190 A | 10/1999 | Fu et al. | |
| 5,978,118 A | 11/1999 | Flaherty | |
| 5,986,788 A | 11/1999 | Sasaki et al. | |
| 5,995,253 A | 11/1999 | Flaherty | |
| 5,999,672 A | 12/1999 | Hunter et al. | |
| 6,008,920 A | 12/1999 | Hendrix | |
| 6,014,237 A | 1/2000 | Abeles et al. | |
| 6,014,479 A | 1/2000 | Darcie | |
| 6,016,212 A | 1/2000 | Durant et al. | |
| 6,031,946 A | 2/2000 | Bergmann et al. | |
| 6,038,355 A * | 3/2000 | Bishop | 359/159 |
| 6,049,404 A | 4/2000 | Wu et al. | |
| 6,055,099 A * | 4/2000 | Webb | 359/435 |
| 6,064,506 A | 5/2000 | Koops | |
| 6,067,389 A | 5/2000 | Fatehi et al. | |
| 6,088,496 A | 7/2000 | Asghari | |
| 6,097,859 A | 8/2000 | Solgaard et al. | |
| 6,111,674 A | 8/2000 | Bhagavatula | |
| 6,125,221 A | 9/2000 | Bergmann et al. | |
| 6,137,933 A | 10/2000 | Hunter et al. | |
| 6,163,643 A | 12/2000 | Bergmann et al. | |
| 6,175,678 B1 | 1/2001 | Sanghera et al. | |
| 6,181,853 B1 | 1/2001 | Wade | |

* cited by examiner though capacity may
METHOD AND DEVICE FOR SWITCHING WAVELENGTH DIVISION MULTIPLEXED OPTICAL SIGNALS USING EMITTER ARRAYS This application claims the benefit of provisional application No. 60/224,692 filed Aug. 11, 2000.

CROSS REFERENCE TO RELATED APPLICATIONS

BACKGROUND OF THE INVENTION

1. Field of Invention

The present invention relates to a device and method for switching wavelength division multiplexed light signals among optical fibers or other transmission media. 2. Description of Related Art Optical communication systems are a substantial and rapidly growing party of communication networks. The expression "optical communication system," as used herein, relates to any system that uses optical signals to convey information across an optical transmission device, such as an optical fiber. Such optical systems may include, but are not limited to telecommunication systems, cable television systems, and local area networks (LANs).

While the need to carry greater amounts of data on optical communication systems has increased, the capacity of existing transmission devices is limited. Although capacity may be expanded, e.g., by laying more fiber optic cables, the cost of such expansion is prohibitive. Consequently, there exists a need for a cost-effective way to increase the capacity of existing optical transmission devices.

Wavelength division multiplexing (WDM) has been adopted as a means to increase the capacity of existing optical communication systems. In a WDM system, plural optical signals are carried over a single transmission device, each channel being assigned a particular wavelength.

An essential part of optical communication systems is the ability to switch or route signals from one transmission device to another. Micro-electromechanical mirrors have been considered for switching optical signals. However, this approach is not suitable for use with 10 systems that use wavelength division multiplexed signals because micro-electromechanical mirrors cannot switch between signals of different wavelengths. Another approach utilizes bubbles that are capable of changing their internal reflection. However, this technique is also unable to switch multiple wavelengths individually. Furthermore, both of these devices have limited switching speeds, in the range of 10 kHz for the mirror devices and in the range of 100 Hz for the bubble devices.

Other switching approaches, such as the approach disclosed in U.S. Pat. No. 4,769,820, issued to Holmes, can switch data at GHz rates, which is effectively switching at GHz transition rates. However, this approach requires substantial optical switching power, has potential cross talk, and cannot resolve wavelength over-utilization issues. What is needed is a means for switching wavelength division multiplexed signals that is capable of doing so at high speeds with no cross talk and requires low switching power.

SUMMARY OF INVENTION

1. Advantages of the Invention

One advantage of the present invention is that it is able to switch signals of different wavelengths.

Another advantage of the present invention is that it is able to switch at high speeds.

Further advantage of the present invention is that it does not require high power.

Another advantage of the present invention is that it does not suffer from crosstalk.

Another advantage of the present invention is that it is able to switch between wavelengths and fibers to avoid transmission device or wavelength over-utilization.

Another advantage of the present invention is that it is able to broadcast to multiple transmission devices or couplers simultaneously.

A further advantage of the present invention is that it is able to regenerate and restore signals.

An additional advantage of the present invention is that it can transmit through air or other intervening media to a receiver without a costly or slow electrical interface.

These and other advantages of the present invention may be realized by reference to the remaining portions of the specification, claims, and abstract.

2. Brief Description of the Invention

The present invention comprises an optical switch device. Tile optical switch device comprises at least one source, a plurality of targets, at least a first and second switch element, and at least one beam splitter. The source is adapted to transmit an optical signal and the plurality of targets is adapted to receive the optical signal. Each switch element comprises a detector, an emitter array, and a switch controller. The detector is positioned to receive light from the source, and it is adapted to detect optical signals. The emitter array is positioned to transmit light to the targets, and the emitter array comprises a plurality of emitters, each emitter being adapted to generate light signals. The switch controller is in communication with the detector and the emitter array. The switch controller is adapted to cause the emitter array to generate the detected signal. The beam splitter is positioned to reflect optical signals to the detector of the first switch element, and the beam splitter is adapted to reflect light within a predetermined range of wavelengths and allow light outside of the predetermined range of wavelengths to pass through the beam splitter. The second switch element is positioned to receive optical signals that pass through the beam splitter and t it optical signals to the plurality of targets.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE PREFERRED EMBODIMENT

Figure 1:
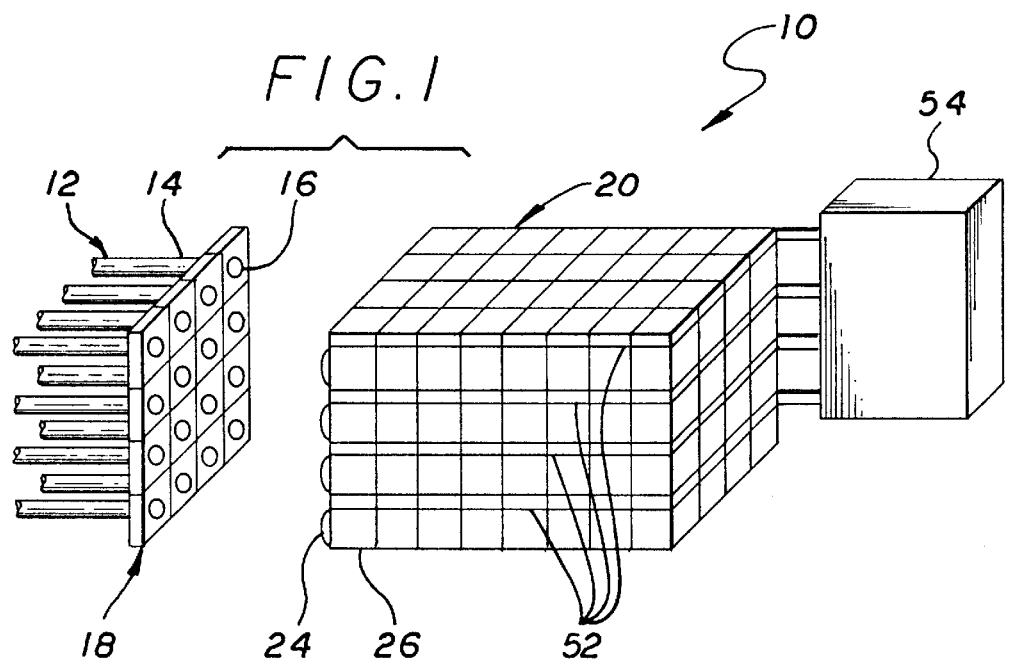
FIG. 1 is substantially a perspective schematic diagram of one switch device of the present invention.

As seen in FIG. 1, the present invention comprises a switch device generally indicated by reference number 10. Switch device 10 may be used in almost any optical communication system. Switch device 10 comprises sources and targets 12 and a switch array 20. Sources and targets 12 comprise a source of incoming light signals and targets on to which switch array 20 transmits outgoing signals. The sources and targets may be the same or different device or objects. In the example shown in FIG. 1, sources and targets 12 are optical fibers 14. However, many other devices and transmission mediums may be used Sources and targets 12 may include any number of fibers 14 and may use many different types of fibers. Each optical fiber 14 comprises an end 16. Ends 16 are preferably arranged in a two dimensional array, wherein the ends are substantially planar. It is recognized that array 18 may have many different configurations, such as the square array shown in FIG. 1 or rectangular arrays.

Figure 2:
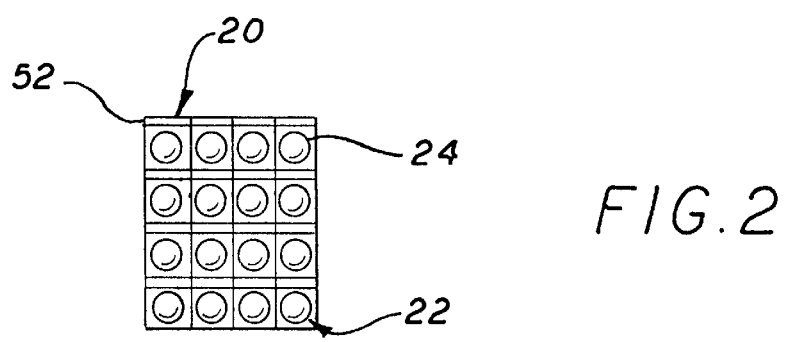
FIG. 2 is substantially a front schematic diagram of one embodiment of the switch array of the present invention.
Figure 3:
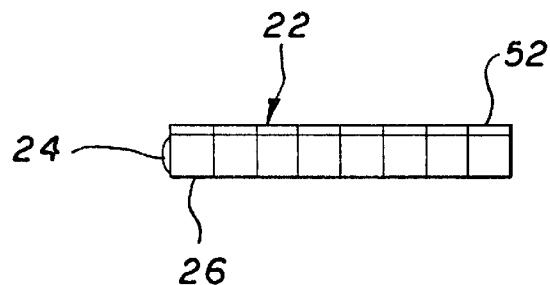
FIG. 3 is substantially a side schematic diagram of the linear array of switch elements of the present invention.

As seen in FIGS. 1, 2, and 3, each linear array 22 is provided with a lens 24. As will be discussed below, lenses 24 focuses light passing between array 18 and linear arrays 22. The focal length of lens 24 should equal the distance from the end 16 to the front of tie switch array 20 Referring to FIG. 3, each linear array 22 comprises at least one switch element 26. Any number of switch elements may be provided.

Referring to FIG. 3, each linear array 22 comprises at least one switch element 26. Any number of switch elements may be provided.

Figure 4:
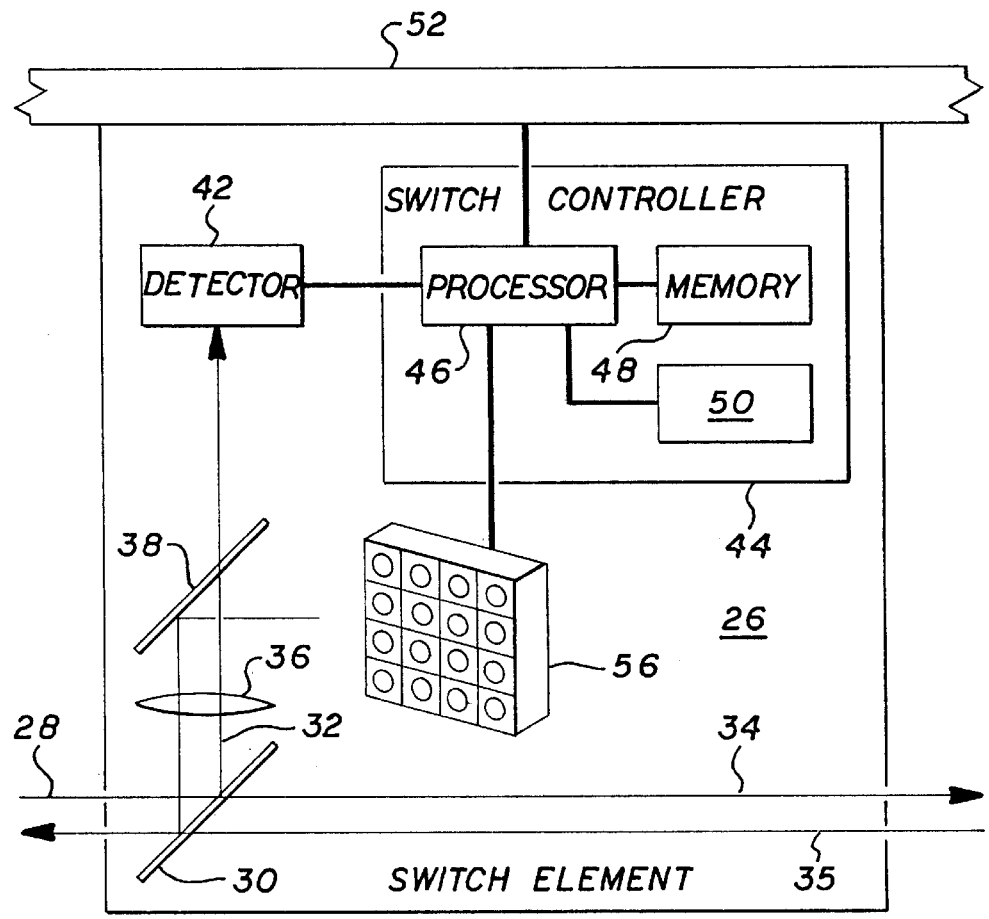
FIG. 4 is substantially a schematic diagram of the switch element of the present invention.

Turning to FIG. 4, each switch element 26 is arranged to receive incoming light 28 from an optical fiber 14 (not shown in FIG. 4). As incoming light 28 enters switch element 26, it intersects beam splitter 30. Beam splitter 30 is a dichroic beam splitter that is adapted to reflect a predetermined wavelength or range of wavelengths of light 32. The beam splitter may be a beam splitter, such as model number 03 BSC 23 or 03 BDL 005 available from Melles Griot, having an office in Irvine Calif.

If incoming light 28 contains the predetermined wavelength that may be reflected by beam splitter 30, the beam splitter reflects that portion 32 of the light. Light that is not the predetermined wavelength will pass through beam splitter 30. This non-reflected light 34 may be transmitted to a second switch element (not shown in FIG. 4) where it would it is subjected to another beam splitter (not shown). However, the beam splitter in the second switch element would be adapted to reflect light in another range of wavelengths and transmit light not in that range to another switch element. In this way, linear array 22 separates wavelength division multiplexed light signals into its individual signals.

As will be discussed below, each switch element may be capable of producing light signals. Light that is produced by other switch elements, outgoing light 35, is transmitted back along the path of incoming light 28. Since the outgoing light does not contain light in the range of wavelengths that is reflected by beam splitter 30, this light passes through the beam splitter and is transmitted out to the front of the linear array.

Reflected light 32 is directed through an optional focusing lens 36. In one embodiment, light 32 then falls on beam splitter 38. Beam splitter 38 allows light 32 to pass to detector 42. Detector 42 is adapted to detect signals in reflected light 32. Detector 42 may generate electrical signals based on the light signals. Detector 42 may be many different well known devices, such as 2609C Broadband Photodiode Module for both 1310 and 1550 nm detection available from Lucent Technologies or InGaAs p-i-n photodiodes for 1000–1700 nm detection, Part C30641E, available from EG&G. The electrical signals are transmitted to switch controller 44.

Switch controller 44 comprises a microprocessor 46 and memory 48. Microprocessor 46 is adapted to determine the intended destination of the light signal and route the signal to an appropriate fiber. Microprocessor 46 may be any of a number of devices that are well known in the art. For example, microprocessor 46 may be an Intel Pentium III or other similar processor. Memory 48 is preferably random access memory that also may be any of a number of devices that are well known in the art. Switch controller 44 may also comprise non-volatile memory 50 that may contain programming instructions for microprocessor 46.

Figure 5:
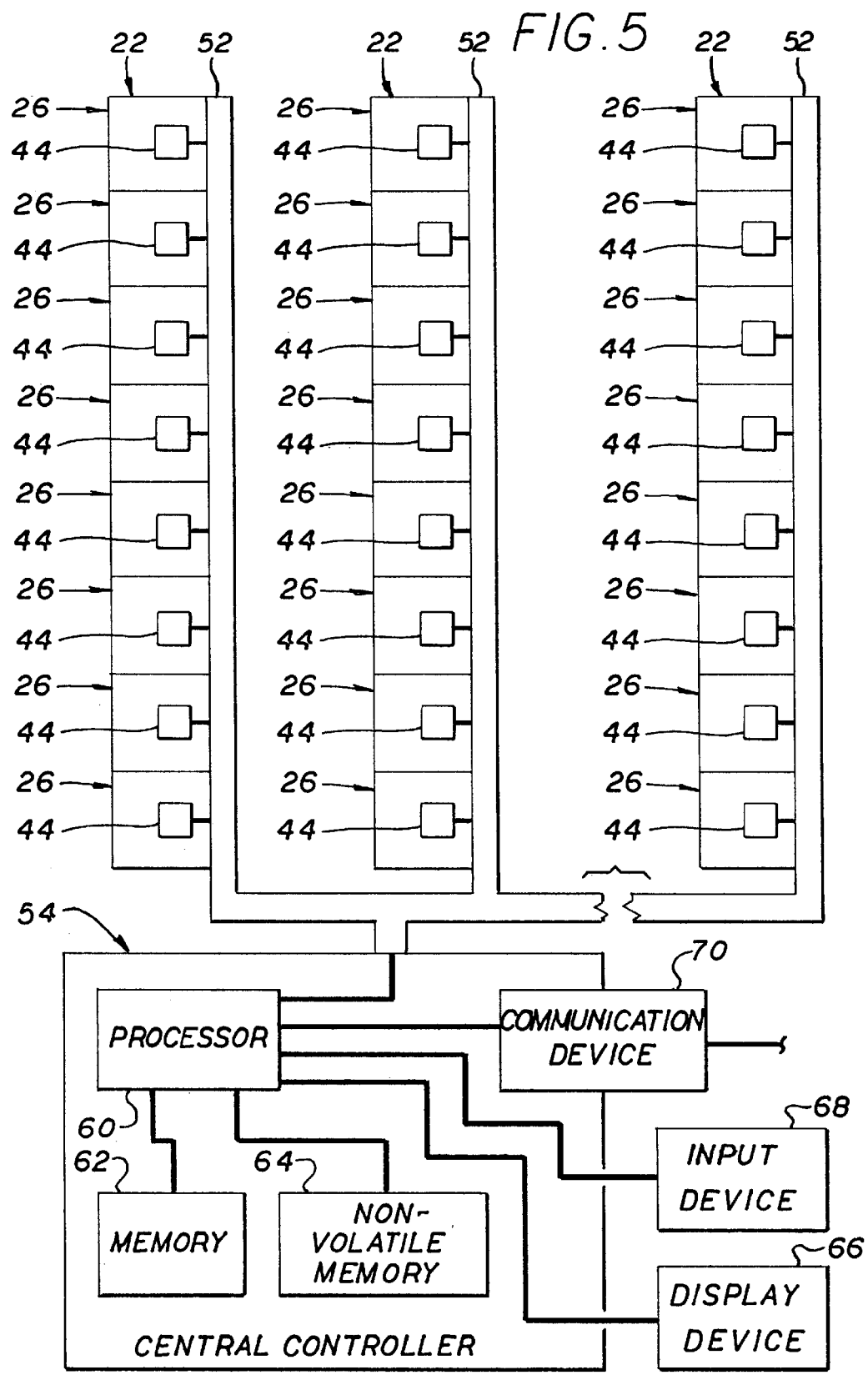
FIG. 5 is substantially a schematic diagram of the switch array and central processor of the present invention.

Each light signal preferably carries a header that contains information that either identifies the signal or indicates its intended destination. Switch controller 44 is adapted to read the header. Switch controller 44 may be adapted, either alone or in coordination with other devices, to determine the destination of the light signal. However, in this embodiment, in order to prevent simultaneous transmissions in the same wavelength on the same optical fiber, which would result in interference when the signals are received, it is necessary for each switch controller 44 to coordinate with other switch controllers. In this embodiment, this may be facilitated by bus 52. Bus 52 is connected to each switch element 26 and it allows each switch element to communicate with a central controller 54 (not shown in FIG. 4). As seen in FIG. 5, central controller 54 is in communication with each bus 52 of each linear array 22. This allows central controller 54 to receive signals from each switch element 26.

Central controller 54 may comprise a processor 60 that is adapted to perform computer operations. Processor 60 is in communication with memory device 62, which may be random access memory (RAM), and non-volatile memory 64, which is adapted to store data when power to controller 54 is interrupted. Non-volatile memory 64 may be many different kinds of memory devices, such as a hard disk drive, flash memory, or erasable programmable read-only memory. (EPROM). Central controller 54 may be in communication with a display device 66, such as a monitor or printer, and input device 68, such as a keyboard Display device 66 and input device 68 are adapted to allow an operator or user to communicate with switch device 10 (see FIG. 1).

Central controller 54 may also comprise a communication device 70, which may be external or internal. Communication device 70 is adapted to allow central controller 54 to communicate with other devices, such as other central processors or a computer that controls the optical system. Communication device 70 may be in a form of at least one of the many different types of devices that are well known in the art such as a modem, a network card, or a wireless communication device.

Figure 6:
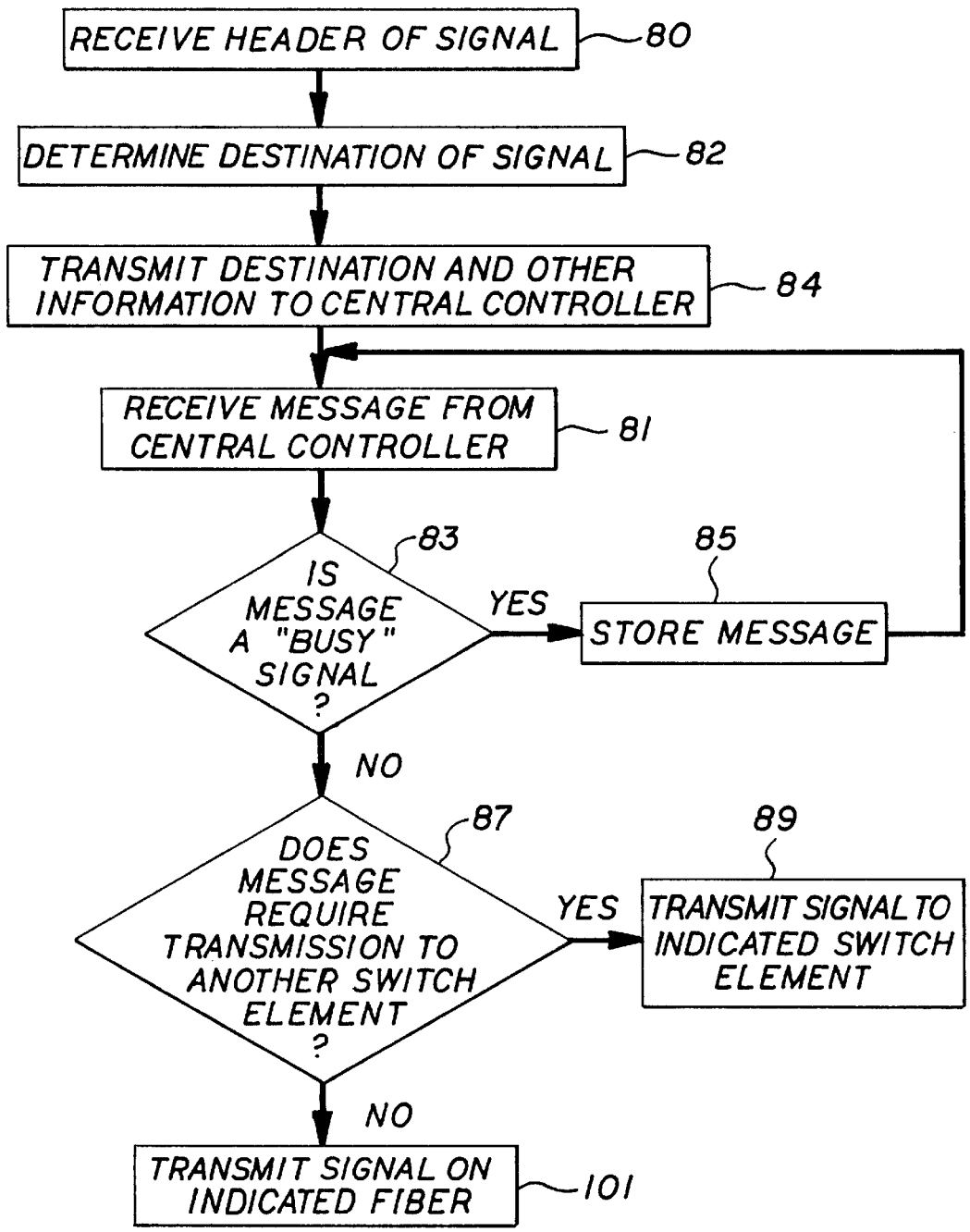
FIG. 6 is substantially a flow chart of operation of the switch controller of the present invention, with regard to the transmission of signals.

Referring now to FIG. 6, when switch element 26 receives a signal, the header of the signal is transmitted to switch controller 44, as seen in step 80. Switch controller 44 then determines the destination of the signal 82 and transmits the destination and other information to central controller 54. Other information may include the size of the signal, the wavelength of the signal, wavelengths in which the switch element capable of transmitting, etc.

Figure 7A:
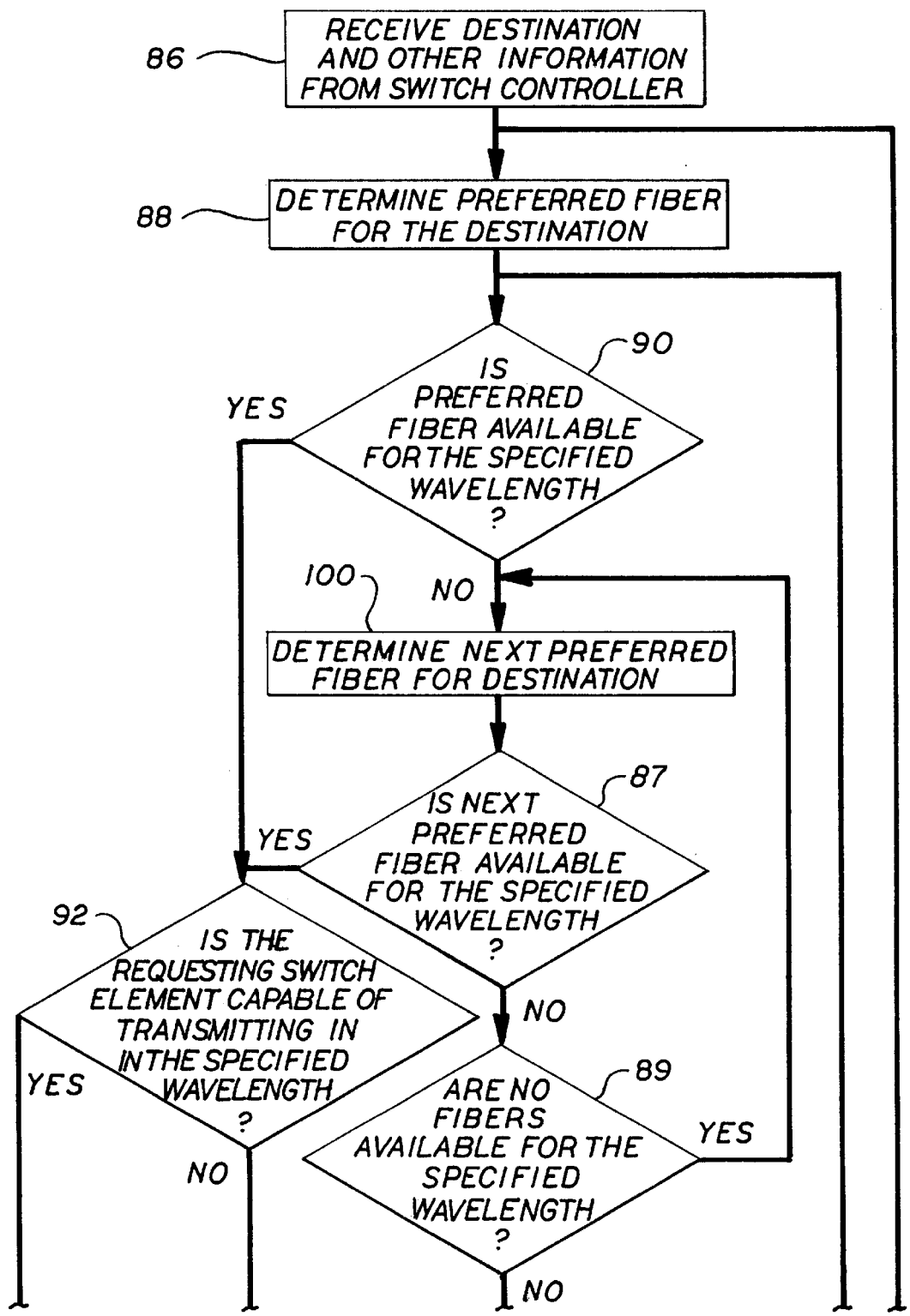
FIGS. 7A and 7B are substantially a flow chart of operation of the central controller of the present invention, with regard to the transmission of signals.
Figure 7B:
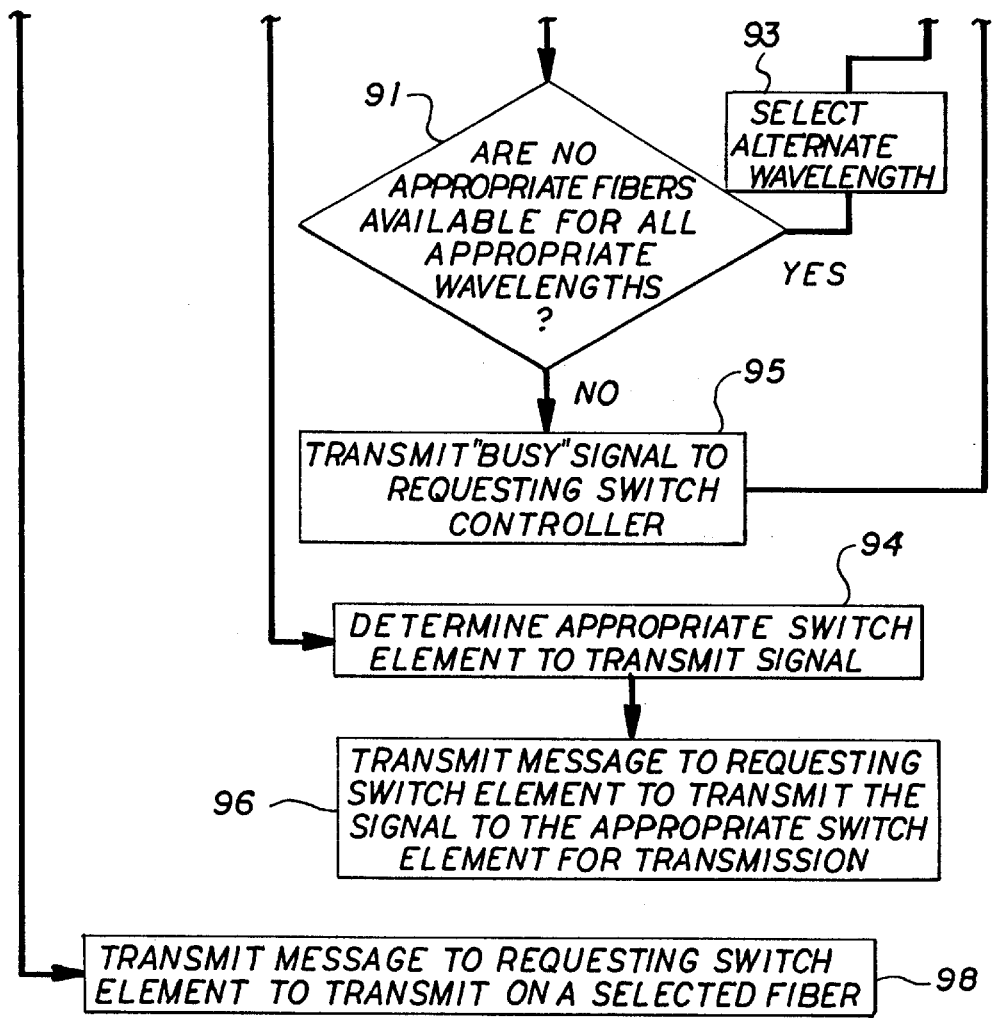

Turning now to FIG. 7, central controller 54 receives the destination and other information from the requesting switch element 86. Central controller 54 then determines the preferred fiber for the particular destination 88. This may be performed by referring to a transmission registry that contains destinations and a number of different fibers that are capable of transmitting the signal to the destination.

The registry may be represented by the following table (Table 1):

TABLE 1

2. DESTINATION REGISTRY

| Destination | Preferred Fiber | Next Preferred Fiber | ... |
|---|---|---|---|
| 1 | A | E | . |
| 2 | F | B | . |
| 3 | C | D | . |
| . | . | . | . |
| . | . | . | . |
| . | . | . | . |

After central controller 54 determines the preferred fiber, it then determines if the preferred fiber is unavailable for the specified wavelength 90. This check may be accomplished in different ways. In one method, central controller 54 keeps a registry of signals being transmitted in each wavelength on each optical fiber 14. This registry may be represented by the table shown below (Table 2):

TABLE 2

3. TRANSMISSION REGISTRY

| Fiber | Wavelength 1 | Wavelength 2 | ... |
|---|---|---|---|
| A | 0 | 1 | . |
| B | 1 | 1 | . |
| C | 0 | 0 | . |
| . | . | . | . |
| . | . | . | . |
| . | . | . | . |

In this table "0" may represent that the designated fiber is not occupied by the designated wavelength and "1" may represent that the fiber is occupied by the designated wavelength. This registry may also be used to store other information about the fibers. When a switch element has completed sending a signal, it may send a signal to central controller 54 that it has completed transmission. Central controller 54 would then clear the registry of the transmission. Alternatively, the registry may be cleared after an appropriate amount of time has passed. The amount of time may be obtained from the original request. In another method, central controller 54 polls each switch element 26 to determine whether it is currently sending a signal.

If the preferred fiber is available for the specified wavelength, central controller 54 then authorizes transmission by the requesting switching element 26, step 98. In an alternative embodiment, switch element 26 may be designed to transmit in a plurality of wavelengths. Emitter array 56 may be capable of transmitting in a plurality of wavelengths, or additional emitter arrays may be adapted to transit in a different wavelength than that of the first emitter array, and beam splitters may be provided. The inquiry in step 92 may be performed by referring to a switch element registry (not shown). The switch element registry may contain a listing of all switch elements and the wavelengths in which they are adapted to transmit. If the requesting switch element is capable of transmitting in the specified wavelength, central controller 54 then transmits a message to the requesting switch element to transit on the selected fiber, 98. If the requesting switch element is not capable of transmitting in the specified wavelength, central controller 54 determines an appropriate switch element to transmit the signal 94. Central controller 54 then transmits a message to the requesting switch element to transit the signal to the appropriate switch element 96 for transmission.

Returning to step 90, if the preferred fiber is not available for the specified wavelength, central controller 54 would then determine the next preferred fiber for the destination 100. Central controller 54 would then determine if the next preferred fiber is available for the specified wavelength 87. If the next preferred fiber is available for the specified wavelength, central controller 54 would go to step 92 and repeat until a fiber is found or no fiber is available at the specified wavelength 89. If no fiber is available for the specified wavelength, central controller 54 would return to step 100. If all fibers are unavailable for the specified wavelength, central controller 54 would determine that all appropriate fibers are unavailable for all appropriate wavelengths 91. If all appropriate fibers are not unavailable for all appropriate wavelengths, central controller 54 would select an alternate wavelength 93 and return to step 90. If all appropriate fibers are unavailable for all appropriate wavelengths, central controller 54 would transmit a "busy" signal to the requesting switch controller 95. Central controller 54 would then return to step 88.

Returning to FIG. 6, switch controller 44 waits for a message from central controller 54. When switch element 44 receives a message from the central controller 8 1, it determines whether the message is a "busy" signal 83. If the message is a busy signal, switch controller 44 may store the message 85 and wait for another message from central controller 54. If the message is not a busy signal, switch controller 44 determines whether the message requires transmission to another switch element 87. If the message requires transmission to another switch element, switch controller 44 transmits the signal to the indicated switch element 89. This may be performed by transmitting the signal over bus 52. If the message does not require transmission to another switch element, switch controller 44 transmits the signal on the indicated fiber 101.

Returning now to FIG. 4, when switch controller 44 sends a signal, it drives emitter array 56 to generate the signal. Emitter array 56 comprises a plurality of different areas or emitters arranged in a two-dimensional array, each area being adapted to independently transmit a light signal. Each individual emitter may be many different kinds of emitters that are suitable for the particular optical fiber system. For example, an individual emitter in the 1310 nm range may be a Daytona laser, model 1861A, available from Lucent Technologies. Emitter array 56 is adapted to produce light in the predetermined range of wavelengths that beam splitter 30 is intended to reflect. Array 56 is also adapted to generate signals in specific areas of the array so that the signal can be mapped on to the appropriate optical fiber or target. As the signal is generated, it is reflected by beam splitter 38 and passes through lens 36. The signal is then reflected by beam splitter 30 back along the path of the incoming light 28. When the signal reaches the front of the array, it is imaged by lens 24 on to array 18. The signal produced by a portion of emitter array 56 is then received by the corresponding optical fiber end 18 or other target. The focal length of lens 36 should be approximately equal to the optical path length from the center of emitter array 56 to the location of the imaging lens. In this way, each switch element can transmit a signal to any or all optical fibers 14 in sources and targets 12.

Figure 8:
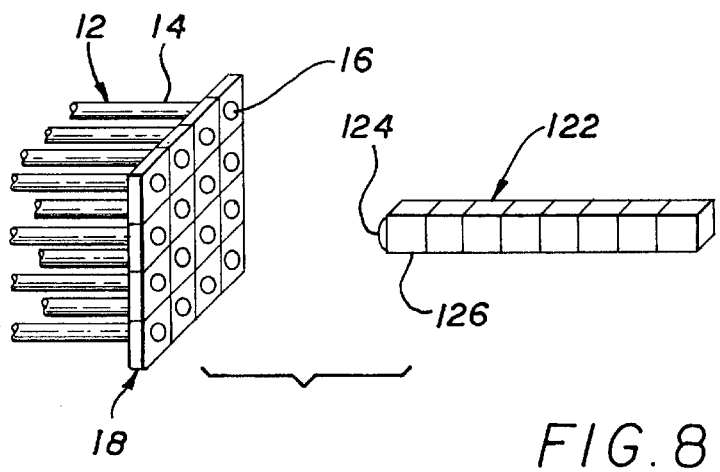
FIG. 8 is substantially a schematic diagram of the preferred embodiment of the switch device of the present invention.

Turning now to FIG. 8, the preferred embodiment of the present invention is similar to the embodiment of the present invention described above. However, switch array is replaced with a single linear army 120. Linear array 120 comprises a lens 124 and a plurality of switch elements 126. Lens 124 performs a similar function to lens 24 (see FIGS. 1 and 3). However, switch elements 126 differ from switch elements 26 in that each switch element comprises a detector array 142 that is capable of detecting signals from each of the optical fibers 14.

Figure 9:
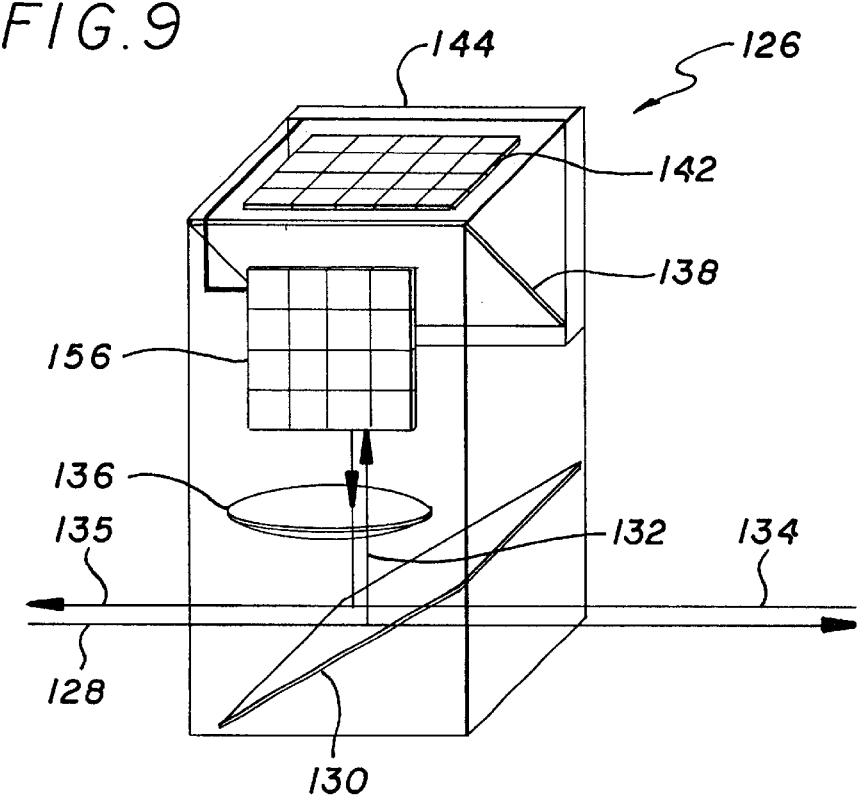
FIG. 9 is substantially a schematic diagram of the switch element of the preferred embodiment of the present invention.

Turning to FIG. 9, each switch element 126 is arranged to receive incoming light 128 from an optical fiber 14 (not shown in FIG. 4). As incoming light 128 enters switch element 126, it intersects beam splitter 130. Similar to beam splitter 30, beam splitter 130 is a dichroic beam splitter that is adapted to reflect a predetermined wavelength or range of wavelengths of light 32.

If incoming light 128 contains the predetermined wavelength that may be reflected by beam splitter 130, the beam splitter reflects that portion 132 of the light. Light that is not the predetermined wavelength will pass through beam splitter 130. This non-reflected light 134 may be transmitted to a second switch element (not shown in FIG. 4) where it would it is subjected to another beam splitter (not shown). Similar to the first embodiment, the beam splitter in the second switch element would be adapted to reflect light in another range of wavelengths and transmit light not in that range to another switch element. Light that is produced by other switch elements, outgoing light 135, is transmitted back along the path of incoming light 128.

Reflected light 132 is directed through an optional focusing lens 136. In this embodiment, light 32 then falls on beam splitter 138. Beam splitter 138 allows light 132 to pass to detector array 142. Detector array 142 is adapted to detect signals in reflected light 132 and, as mentioned above, detector array 142 is capable of distinguishing different signals that are being transmitted by different fibers 14 or sources. Detector 142 may generate electrical signals based on the light signals. The electrical signals are transmitted to switch controller 144.

Switch controller 144 may be similar to switch controller 44 with a microprocessor and memory (not shown). Microprocessor 46 is adapted to determine the intended destination of light signals and route the signals to an appropriate fiber.

In this embodiment, since each switch element 126 is capable of receiving light signals from each fiber 14 in a predetermined range of wavelengths, conflicts or interferences between signals can be handled within the switch element. Switch controller 144 may have its own destination registry (see Table 1) and transmission registry (see Table 2), and it can be programmed to manage signals using the methods described above.

This embodiment has several advantages over the previous embodiment. This embodiment only requires one linear array 122, and it may not be necessary to provide a bus and a central controller. Thus, the complexity and cost of the device may be less. Furthermore, since transmission need not be coordinated through a central controller, signals can be retransmitted more quickly and conflicts can be resolved more quickly.

However, it is recognized that it may be desirable to provide some form of communication device, such as bus 52, and an outside controller, such as central controller 54, to update switch controller 144. For example, if a fiber has been disconnected from the network, switch controller 144 would need to be informed that this fiber is no longer available for transmission. In addition, device 10 may also be a node from which data is downloaded. In this application, it would be necessary for each switch element 126 to transmit data to another device to make use of the information.

It is also recognized that a plurality of detector and emitter arrays may be used in one switch element to detect and emit a plurality of wavelengths. This would allow one switch element to perform the same function of a linear array of switch elements. Thus, the switch device of the present invention may comprise only a single switch element. The same result could be obtained by using single detector and emitter arrays that are adapted to detect and emit a plurality of wavelengths.

Figure 10:
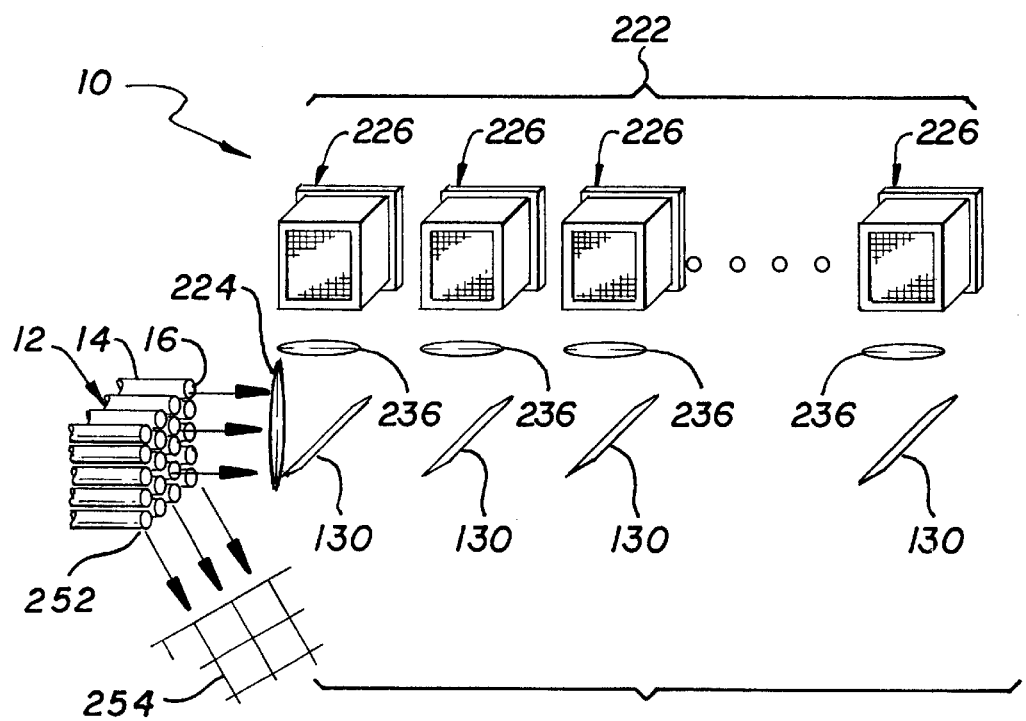
FIG. 10 is substantially a schematic diagram of another embodiment of the switch device of the present invention.

The embodiment disclosed in FIG. 10 utilizes a linear array 222 that is similar to linear array 122. However, each switch element 226 comprises a multi-focal lens that is adapted to focus light differently depending upon the target of the light. This embodiment also includes mirrors 252 that can be used to direct the light to a target 254 without an optical waveguide. This embodiment is useful for applications where light is transmitted to targets over a short distance. For example, instead of installing optical fibers throughout an existing building, this embodiment of the present invention can be used to transmit signals to specific locations on the exterior of the building where a detector can receive the signal. An emitter associated with the detector can transmit signals to the device 10.

CONCLUSION

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. An optical switch device, comprising:
   (A) at least one source, the source being adapted to transmit an optical signal;
   (B) a plurality of targets, the targets being adapted to receive the optical signal; and
   (C) at least a first and second switch element, each switch element comprising:
      (a) a detector positioned to receive light from the source, the detector being adapted to detect optical signals;

(b) an emitter array positioned to transmit light to the targets, the emitter array comprising a plurality of emitters, each emitter being adapted to generate light signals, wherein light signals generated by each emitter are transmitted to at least one of the plurality of targets; and (c) a switch controller in communication with the detector and the emitter array, the switch controller being adapted to cause the emitter array to generate the detected signal;

(D) a beam splitter positioned to reflect optical signals to the detector of the first switch element, the beam splitter being adapted to reflect light within a predetermined range of wavelengths and allow light outside of the predetermined range of wavelengths to pass through the beam splitter, the second switch element being positioned to receive optical signals that pass through the beam splitter and transmit optical signals to the plurality of targets.

2. The optical switching device of claim 1 wherein the source comprises an optical transmission medium.

3. The optical switching device of claim 1 wherein at least one of the targets is an optical transmission device.

4. The optical switching device of claim 1 further comprising a central processor, the central processor being in communication with the switch controller, the central processor providing information to the switch controller.

5. The optical switching device of claim 1 wherein the detector of the switch element is adapted to simultaneously receive a plurality of signals in the same wavelength.

6. An array of optical switch elements, the array comprising:

(A) at least a first and second switch element, each switch element comprising the following:
   (a) a detector, the detector being adapted to detect optical signals;
   (b) an emitter array positioned to transmit light to a plurality of targets, the emitter array comprising a plurality of emitters, each emitter being adapted to generate light signals, wherein light signals generated by each emitter are transmitted to at least one target;
   (c) a switch controller in communication with the detector and the emitter array, the switch controller being adapted to cause the emitter array to generate the detected signal;

(B) a beam splitter, the beam splitter being adapted to reflect light of a predetermined wavelength and allow light outside of the predetermined wavelength to pass through the beam splitter, the beam splitter being positioned to reflect light transmitted by a source to the detector of the first switch element, the detector of the second switch element being positioned to receive light that passes through the beam splitter.

7. The array of optical switch elements of claim 6 wherein the detector is adapted to simultaneously detect optical signals in the same wavelength.

8. A method of switching optical signals, the method comprising the following steps:

(A) providing at least a first and second switch element, each switch element comprising:
   (a) a detector positioned to receive light from a source, the detector being adapted to detect optical signals; and
   (b) an emitter array positioned to transmit light to a plurality of targets, the emitter array comprising a plurality of emitters, each emitter being adapted to generate light signals, wherein light signals generated by each emitter are transmitted to at least one predetermined target;

(B) causing light of a predetermined range of wavelengths to be received by the detector of a first switch element;

(C) causing light outside of the predetermined range of wavelengths to be received by the detector of the second switch element;

(D) detecting an optical signal;

(E) determining a target to which to transmit the optical signal; and (F) causing the emitter in at least one of the emitter arrays to generate the optical signal, the emitter in the emitter array corresponding to the target, wherein the optical signal is transmitted to the target.

* * * * *